June 2, 1970          G. L. BEALL          3,515,413
HOSE ATTACHMENT
Filed Nov. 20, 1968
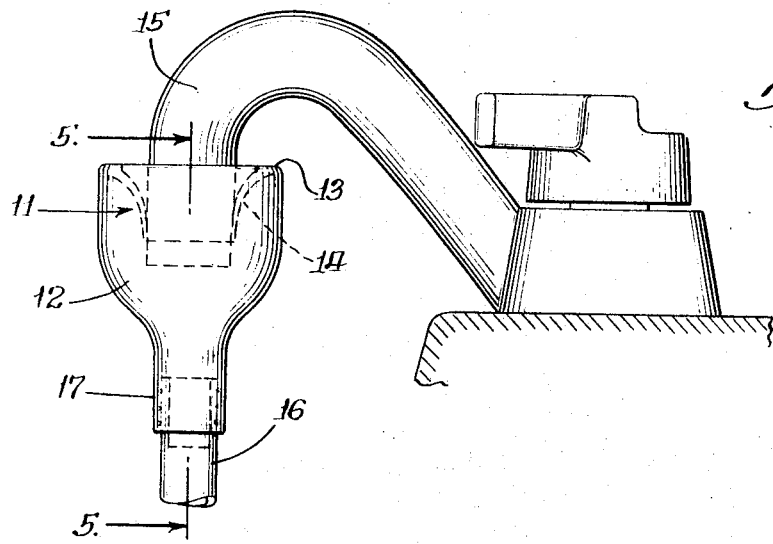
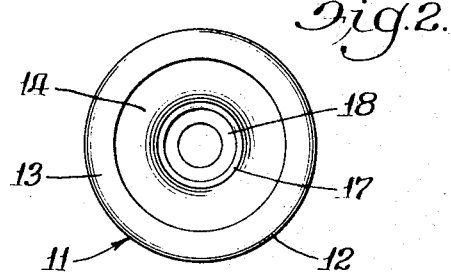
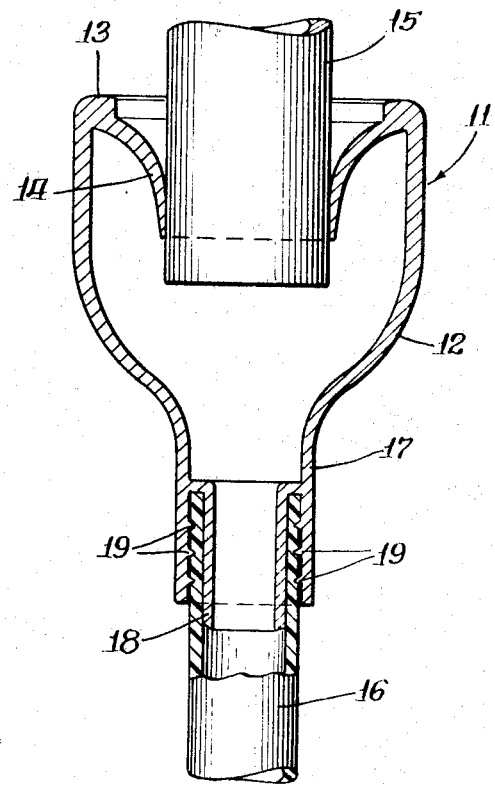
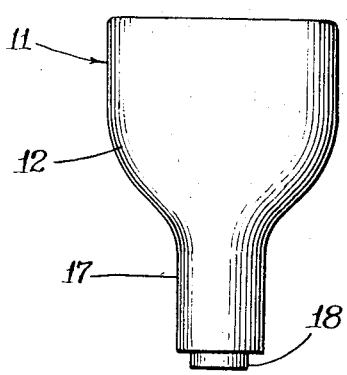
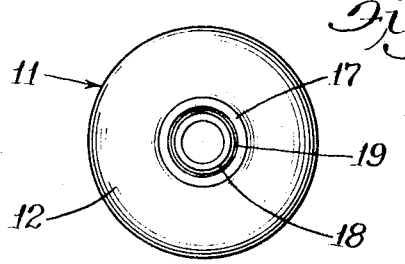
Inventor:
Glenn L. Beall
By Davis, Lucas, Brewer & Brugman
Attys.

United States Patent Office 3,515,413
Patented June 2, 1970

3,515,413
HOSE ATTACHMENT
Glenn L. Beall, Gurnee, Ill., assignor to The Faucet-Queens Inc., Chicago, Ill., a corporation of Delaware
Filed Nov. 20, 1968, Ser. No. 777,350
Int. Cl. F16l *21/08*
U.S. Cl. 285—8                                1 Claim

ABSTRACT OF THE DISCLOSURE

Attachment adapted to be removably mounted on an end of a hose comprising a hollow body of plastic with a tubular neck having inner annular ribs spaced from each other longitudinally of the neck and a resilient inner annular flange secured thereto at inner end, extending beyond neck and spaced inwardly from neck to define therewith an annular space for readily removably receiving an end of the hose, whereby fluid in or passing through the mounted attachment will exert radially outward pressure against interior of annular flange to clampingly engage hose to resist separation of hose and attachment.

BACKGROUND OF THE INVENTION

Field of the invention

This invention relates generally to hose attachments, and more particularly to the provision of an attachment which may readily be removably mounted on the end of a hose but will effectively be restrained against removal during use.

Description of the prior art

Attachments, such as for faucet connection, spray heads, and the like, customarily either are permanently secured to the end of their associated hose, as by clamping, crimping or a suitable adhesive, or are threadly engageable therewith or with a fitting secured thereto. Permanent attachment is objectionable in respect of resulting packaging problems, hose replacement, and the like, and the known means for removably securing an attachment to a hose are relatively expensive.

SUMMARY OF THE INVENTION

This invention resolves the difficulties and objections to the prior art devices by providing an inexpensive means for readily removably mounting an attachment on the end of a hose which will effectively be restrained against removal during use comprising a resilient annular flange disposed interiorly of a neck on the attachment, secured at its inner end to the neck and radially spaced therefrom a distance substantially equal to the wall thickness of the hose to define an annular space for readily removably receiving an end of the hose, with annular ribs preferably formed on the inner surface of the neck spaced from each other longitudinally thereof, whereby fluid in or passing through the attachment when in use will exert radially outward pressure against the interior surface of the annular flange to clampingly engage the end of the hose to resist separation of the latter and the attachment.

In the drawings:

FIG. 1 is a side elevational view showing an attachment embodying the features of the invention mounted on the depending end of a faucet and the upper end of a hose;

FIG. 2 is a top plan view of the attachment;

FIG. 3 is an elevational view similar to FIG. 1 of the attachment alone;

FIG. 4 is a bottom plan view of the attachment; and

FIG. 5 is a vertical section on an enlarged scale taken substantially on the line 5—5 of FIG. 1, and illustrating the clamping effect on the hose resulting from the pressure of fluid in or passing through the mounted attachment.

DESCRIPTION OF THE PREFERRED EMBODIMENT

Referring more specifically to the drawings, reference numeral 11 indicates in general an attachment embodying the features of the invention in the form of a hollow body 12 having an upper rim portion 13 formed integrally therewith and with an inwardly and downwardly curved resilient flange 14 (FIGS. 2 and 5) shaped to receive the terminal end of a faucet 15 and frictionally embrace the same to remoavbly mount the attachment thereon. The attachment 11 also is adapted to be readily removably mounted on an end of a hose 16 (FIGS. 1 and 5) which preferably comprises a suitable extruded vinyl plastic.

To this end, the hollow body 12 terminates at its lower end in a tubular neck 17 interiorly dimensioned to slidably engage the exterior surface of the hose 16. A resilient interior annular flange 18 is secured at its upper or inner end to, or formed integrally with, the tubular neck 17, extends downwardly or outwardly somewhat beyond the end of neck 17, and is spaced radially inward from the inner wall of the hose 16 to define an annular space for readily removably receiving an end of the hose. The interior surface of the tubular neck 17 also preferably is provided with a plurality of annular ribs 19 spaced from each other longitudinally thereof. It is contemplated that the attachment 11 be injection molded from a suitable plastic and one which provides the necessary resiliency, particularly for the annular flange 18, is the styrene-butadiene derivative plastic marketed by Shell Chemical Company under the name "Thermolastic."

As previously noted, when in its relaxed and unmounted position of FIGS. 2–4, the annular space between the neck 17 and inner flange 18 of the attachment 11 is such as to slidably receive an end of the hose 16. The resilient nature of the neck or outer sleeve 17 squeezes its annular ribs into the hose 16 to maintain engagement therewith, the hose also being resilient through preferably less so than the sleeve 17. The resilient nature of the latter, however, also permits ready manual separation of the hose and the attachment 11 when no pressure exists interiorly of the attachment. When mounted on the hose 16 and during use, including the presence or passage therethrough of water or other fluid, however, radially outward pressure will be exerter by the fluid against the interior of the annular flange 18 to clampingly engage the end of the hose to resist separation of the latter from the attachment, as is illustrated in FIG. 5. This illustration also shown how the annular ribs 19 increase the effectiveness of such clamping engagement. Extending the lower or outer end of the annular flnage 18 beyond the tubular neck 17 of the atachment 11 facilitates mounting thereof on the end of the hose 16 by guidingly engaging the bore of the hose.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. An attachment for a hose, comprising a hollow body having a tubular neck removably slidably engageable with the exterior surface of an end of the hose, and a resilient interior annular flange secured at its inner end to said neck and spaced inwardly from the inner wall of said neck a distance substantially equal to the wall thickness of said hose to define an annular space for readily removably receiving an end of said hose, whereby fluid in or passing through the attachment when an end of the hose is disposed in said annular space will exert radially outward pressure against the interior of said annular flange to clampingly engage the end of said hose to resist separation of the latter and the attachment, annular ribs formed on the interior surface of said tubular neck spaced from each other longitudinally thereof to increase the effectiveness of such clamping engagement of the end of said hose due to fluid in the attachment, wherein said body is plastic and said annular flange is formed integrally therewith and wherein said body terminates opposite said tubular neck in a rim portion formed integrally with an inwardly curved flange shaped to receive the terminal end of a faucet and resiliently embrace the same to mount the attachment thereon.

References Cited

UNITED STATES PATENTS

| | | | |
|---|---|---|---|
| 2,470,359 | 5/1949 | McLean | 285—423 X |
| 2,244,280 | 6/1941 | Aghnides | 285—8 |
| 2,383,235 | 8/1945 | Brown | 285—8 |
| 2,507,536 | 5/1950 | Goodson | 285—8 |
| 3,262,721 | 7/1966 | Knight | 285—242 X |

DAVE W. AROLA, Primary Examiner

U.S. Cl. X.R.

285—110, 331, 423